3,091,843
Patented June 4, 1963

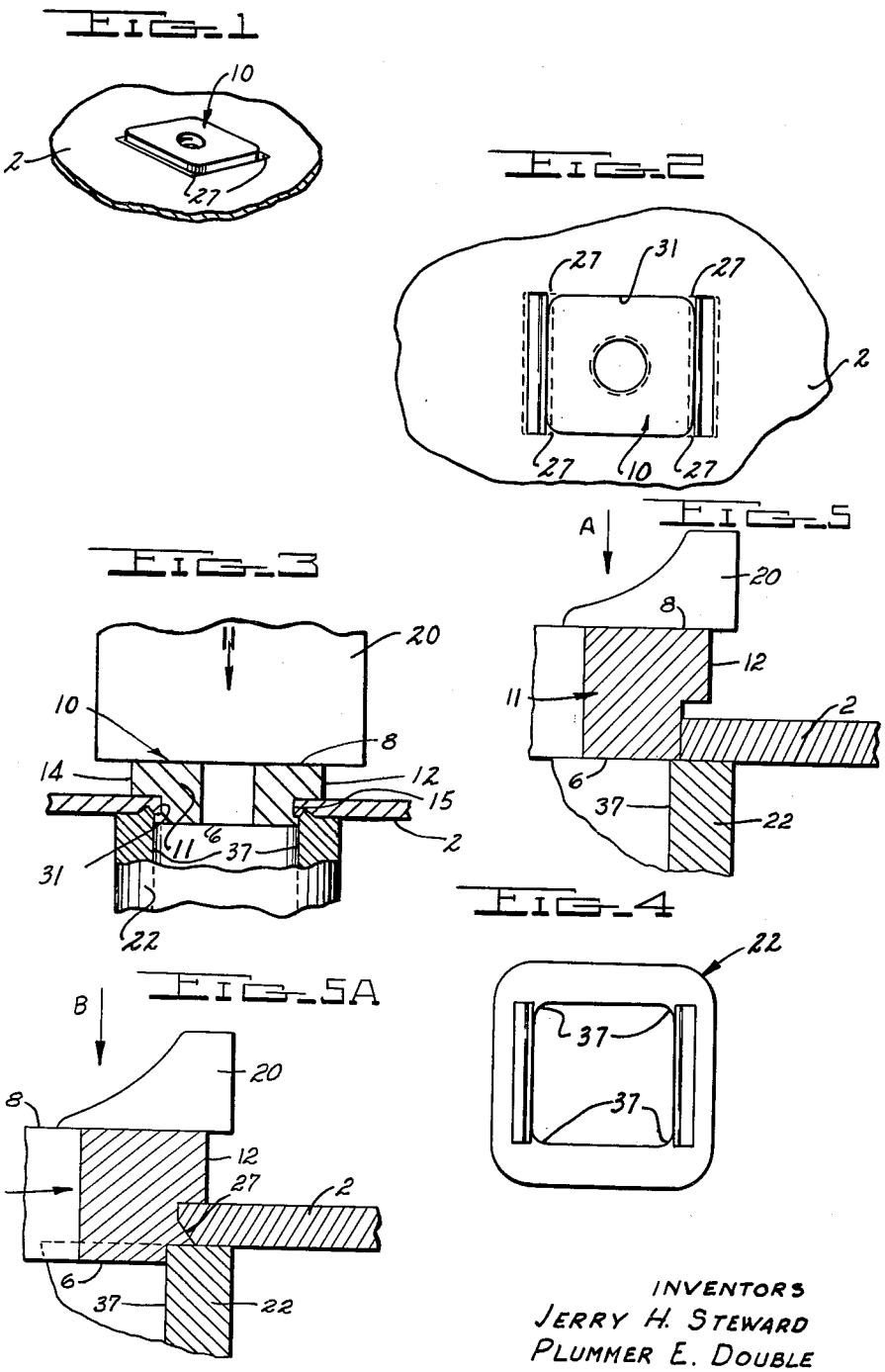

3,091,843
METHOD OF APPLYING STRESS RELIEVED FASTENERS
Plummer E. Double, Detroit, and Jerry H. Steward, Bloomfield Hills, Mich., assignors to Multifastener Corp., Redford, Mich.
Filed Apr. 14, 1960, Ser. No. 22,183
1 Claim. (Cl. 29—432)

The present invention relates to a method of stress relieving self-piercing rivets and fasteners. Various types of self-piercing fastener constructions have been developed in an attempt to obtain a strong bond between the fastener and the part or panel to which it is attached. In most instances, the fastener is constructed so that it may be deformed after it is positioned on the part to which it is to be attached. Such constructions have not proven very effective in general use and have proven to be entirely unsuitable for many specific applications.

Manufacturing techniques in the mass production of fasteners involve operations which leave many sharp corners and edges. To substitute a radius for the sharp corners would be difficult and would make the price of the finished part prohibitive. Therefore, radii have not been placed on the sharp corners of production parts.

After the parts with sharp corners have been assembled in finished products, the pressure of the sharp corners results in a stress concentration. The concentration of stresses manifests itself by failure of the panel or part on which the fastener has been applied. This failure occurs through fracture points which develop and coincide with the sharp corners of the fasteners.

It is an object of the present invention to provide, in a method of securing to a planar portion of a panel a pierce nut having a rectangular pilot portion having sharp corners, opposed laterally projecting shoulders and undercut grooves intermediate the shoulders and the pilot portion, the steps of interposing the panel between the nut and a die button having a bore of a cross section conforming generally to the size and contour of the nut pilot portion with the exception of radiused corners registering with the pilot portion corners, and, in a single uninterrupted motion, relatively moving the panel, the nut and the die button to perform the steps of (1) piercing the nut pilot portion through the panel, (2) radiusing the nut pilot portion corners by shearing and extruding nut metal therefrom at the die button bore corners as the nut shoulders approach and bottom on the panel in opposition to the die button, and (3) swaging panel metal into the nut grooves by cooperation of the die button and the nut shoulders while simultaneously extruding substantially all of the nut metal so sheared from the nut corners between the nut and the panel while all of the nut pilot portion projecting beyond the plane of said panel portion projects into and is snugly confined by the die button bore.

Other objects of this invention will appear in the following description and appended claim, reference being had to the accompanying drawings forming a part of this specification wherein like reference characters designate corresponding parts in the several views.

In the drawings:

FIG. 1 is a perspective view of a fastener which has been affixed to a panel member using our new improved method.

FIG. 2 is a plan view of FIG. 1.

FIG. 3 is a cross sectional view of the fastener assembled on a panel member and partially broken away to illustrate the apparatus.

FIG. 4 is a bottom plan view of the button die.

FIGS. 5 and 5A are enlarged cross-sectional views taken through a corner of the fastener similar to FIG. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, FIGS. 1 and 2 represent the fastener 10 of the present invention mounted on a panel member 2. The fastener shown is generally rectangular in configuration and has substantially parallel top and bottom faces 6 and 8. A pair of flanges 12 and 14, one on each end, extend from the body 10. A groove 15 is cut in two opposite edges of the body between the flanges 12 and 14 and face 6 of the body. The grooves 15 provide squared shoulders which are adapted to receive metal displaced from the panel 2 on which the fastener 10 is mounted. The side walls of the undercut grooved portion are substantially parallel. However, these walls may be tapered if desired. The intersection of the edges of the rectangular shank portion 11 and top 6 form the cutting edges used in piercing the fastener shank 11 through the panel member 2.

The fastener 10 and sheet metal panel 2 are joined as shown in FIGS. 1, 2, and 3 of the drawings. FIG. 3 illustrates the apparatus used.

The first step in the present method consists of placing the fastener 10 intermediate a ram 20 and sheet metal panel 2. Then, using the edges of the body shank as a punch, the ram 20 moves down to pierce the fastener through the panel member 2. Disposed below the panel member 2 is a generally hollow die button 22. The end of the fastener body shank portion 11 is received in the generally hollow die button 22. The die button 22 is of such configuration as to displace the metal surrounding the pierced opening in the panel 2 into engagement with the undercut portion 15 of the fastener. Additionally, the corners 37 of the die button 22 are radiused so as to cut away and extrude the corner portions 27 of the fastener into the sharply cut corner portions of the pierced opening 31 in the panel 2. This method provides four radial stress relieved corners on the fastener and a densified portion at each of the corners thereof where cracks normally result from excessive stress concentration.

FIGURES 5 and 5A show the ram 20 and the die 22 illustrated in FIGURE 3 of the drawings. For purposes of clarity and explanation, two positions of the ram are shown. Position "A" of the ram illustrates the fastener after it has been pierced through panel 2 and just prior to cutting away and extruding the corners 27, while the second position "B" illustrates the end of the ram stroke.

It will be noted that since this view is taken substantially diagonally to the fastener shank 11, the radiused portion 37 of the die button 22 engages the corner portions of the fastener (position "A"). Therefore, as the ram 20 moves downward to cause the undersides of the flanges 12 and 14 to engage the upper surface of the panel 2, the corners (4) are cut away and displaced into the panel proper. The corner portions of the fastener are then integral with the panel. This provides a stress relieved fastener with a densified portion adjacent each of the corners thereof.

This new and improved fastener is achieved without any additional expense, other than the slight revision of the tooling used to provide the radiused corner portions. The instant method of securing a fastener to a panel member is extremely simple, efficient and produces a highly unusual product with a minimum cost. The present construction provides a structure disposed substantially flush with one face of the panel, rendering embossment unnecessary. If however, it is desired to emboss the panel, such an operation may be easily accomplished at the time of the piercing operation with little additional expense.

Having thus described our invention, we claim:

In a method of securing to a planar portion of a panel a pierece nut having a rectangular pilot portion having sharp corners, opposed laterally projecting shoulders and undercut grooves intermediate the shoulders and the pilot portion, the non-shouldered sides of the nut being planar and coextensive with the corresponding side of the pilot portion, the steps of interposing the panel between the nut and a die button having a bore of a cross section conforming generally to the size and contour of the nut pilot portion with the exception of radiused corners registering with the pilot portion corners, and, in a single uninterrupted motion, relatively moving the panel, the nut and the die button to perform the steps of (1) piercing the nut pilot portion through the panel (2) radiusing the nut pilot portion corners by shearing and extruding nut metal therefrom at the die button bore corners as the nut shoulders approach and bottom on the panel in opposition to the die button, and (3) swaging panel metal into the nut grooves by cooperation of the die button and the nut shoulders while simultaneously extruding substantially all of the nut metal so sheared from the nut corners between the nut and the panel while all of the nut pilot portion projecting beyond the plane of said panel portion projects into and is snugly confined by the die button bore.

References Cited in the file of this patent
UNITED STATES PATENTS

| | | |
|---|---|---|
| 2,707,322 | Strain et al. | May 3, 1955 |
| 2,750,660 | Newcomb | June 19, 1956 |
| 2,799,188 | Newcomb | July 16, 1957 |